United States Patent
Thomas et al.

(10) Patent No.: US 11,002,833 B2
(45) Date of Patent: May 11, 2021

(54) SPOTTING SCOPE WITH INTEGRATED LASER RANGEFINDER AND RELATED METHODS

(71) Applicant: Gunwerks, LLC, Cody, WY (US)

(72) Inventors: Christopher Thomas, Cody, WY (US); Forrest Babcock, Carlton, OR (US); Matt Kepler, Cody, WY (US); Haizhou Li, Cody, WY (US)

(73) Assignee: GUNWERKS, LLC, Cody, WY (US)

( * ) Notice: Subject to any disclaimer, the term of this patent is extended or adjusted under 35 U.S.C. 154(b) by 267 days.

(21) Appl. No.: 15/962,202

(22) Filed: Apr. 25, 2018

(65) Prior Publication Data
US 2018/0313939 A1 Nov. 1, 2018

Related U.S. Application Data

(60) Provisional application No. 62/491,850, filed on Apr. 28, 2017.

(51) Int. Cl.
*G01S 7/00* (2006.01)
*G01S 7/481* (2006.01)
*G01S 17/08* (2006.01)
*G02B 27/14* (2006.01)
*G06F 3/01* (2006.01)
*G02B 27/01* (2006.01)
*G02B 23/04* (2006.01)
*G02B 25/00* (2006.01)
(Continued)

(52) U.S. Cl.
CPC .......... *G01S 7/4816* (2013.01); *G01S 7/4813* (2013.01); *G01S 17/08* (2013.01); *G02B 23/04* (2013.01); *G02B 25/001* (2013.01); *G02B 27/0101* (2013.01); *G02B 27/0189* (2013.01); *G02B 27/141* (2013.01); *G02B 27/142* (2013.01); *G06F 3/013* (2013.01); *G06F 3/017* (2013.01); *G06F 3/04897* (2013.01); *G01S 7/51* (2013.01); *G02B 2027/0141* (2013.01)

(58) Field of Classification Search
CPC ...... G01S 7/4816; G01S 7/4813; G01S 17/08; G01S 7/51; G02B 23/04; G02B 25/001; G02B 27/0101; G02B 27/0189; G02B 27/141; G02B 24/142; G02B 2027/0141; G06F 3/013; G06F 3/017; G06F 3/04897
USPC ....................................................... 356/5.01
See application file for complete search history.

(56) References Cited

U.S. PATENT DOCUMENTS

5,260,578 A * 11/1993 Bliton .................... G02B 13/14
250/461.1
6,891,141 B2 * 5/2005 Kaneko ................ G01C 15/002
250/201.2
(Continued)

*Primary Examiner* — James R Hulka
(74) *Attorney, Agent, or Firm* — Dorsey & Whitney LLP (57) ABSTRACT

An optical instrument, such as a spotting scope, is provided. The optical instrument may include a range finder configured to calculate or otherwise determine a distance between the optical instrument and an identified object. The optical instrument may also include a display and a user interface. In some embodiments, an operation system associated with the optical instrument may include sensing touchless gestures. For example, hand gestures or eye gestures may be used to navigate a user interface, to actuate the laser range finder, to alter the brightness of a display, or to carry out any of a number of other operational commands.

21 Claims, 7 Drawing Sheets

(51) Int. Cl.
*G06F 3/0489* (2013.01)
*G01S 7/51* (2006.01)

(56) References Cited

U.S. PATENT DOCUMENTS

| | | | |
|---|---|---|---|
| 7,961,381 B2* | 6/2011 | Pochapsky | G02B 23/12 |
| | | | 359/353 |
| 8,384,884 B2* | 2/2013 | Kaneko | G01C 3/08 |
| | | | 356/5.01 |
| 8,826,583 B2* | 9/2014 | Kepler | G01B 11/27 |
| | | | 42/119 |
| 9,372,051 B2* | 6/2016 | Kepler | G01B 11/272 |
| 2004/0178322 A1* | 9/2004 | Kaneko | G01C 15/002 |
| | | | 250/201.2 |
| 2006/0039065 A1* | 2/2006 | Dunne | G01S 7/4813 |
| | | | 359/399 |
| 2007/0139954 A1* | 6/2007 | Sander | G02B 6/2804 |
| | | | 362/575 |
| 2007/0223087 A1* | 9/2007 | Pochapsky | G02B 23/12 |
| | | | 359/359 |
| 2010/0103508 A1* | 4/2010 | Pochapsky | G02B 23/12 |
| | | | 359/353 |
| 2010/0265490 A1* | 10/2010 | Watanabe | G01C 3/04 |
| | | | 356/5.01 |
| 2012/0030985 A1 | 2/2012 | Mauricio et al. | |
| 2012/0097741 A1 | 4/2012 | Karcher | |
| 2012/0194419 A1* | 8/2012 | Osterhout | G02B 27/0093 |
| | | | 345/156 |
| 2014/0002812 A1* | 1/2014 | Kepler | G02B 27/14 |
| | | | 356/138 |
| 2014/0063261 A1* | 3/2014 | Betensky | G02B 23/145 |
| | | | 348/158 |
| 2014/0368939 A1* | 12/2014 | Andreasen | G01B 11/2513 |
| | | | 359/847 |
| 2015/0059226 A1* | 3/2015 | Kepler | G01B 11/27 |
| | | | 42/114 |
| 2015/0185324 A1* | 7/2015 | Cooper | G01S 3/784 |
| | | | 356/4.01 |
| 2015/0369565 A1* | 12/2015 | Kepler | G02B 27/1066 |
| | | | 348/143 |
| 2017/0227327 A1 | 8/2017 | Thomas et al. | |

* cited by examiner

SPOTTING SCOPE WITH INTEGRATED LASER RANGEFINDER AND RELATED METHODS

CROSS-REFERENCE TO RELATED APPLICATIONS

This application claims the benefit of U.S. Provisional Patent Application No. 62/491,850, filed Apr. 28, 2017, the disclosure of which is hereby incorporated by reference in its entirety.

BACKGROUND

Various optical instruments are utilized to view distant objects. For example, spotting scopes, riflescopes, telescopes, binoculars, or other instruments may be used to view various objects at substantial distances. Often, telescopes are used to observe extraterrestrial objects (e.g., planets, stars, galaxies). Other types of devices such as spotting scopes, riflescopes and binoculars, are often used to view terrestrial objects including wildlife, geographical formations, targets during shooting or hunting activities, and a variety of other objects. Many optical instruments provide variable magnifications, making it possible to "zoom" in or out, resulting in the magnification of the viewed image changing to fit the user's preference or need.

Spotting scopes are typically more powerful in terms of magnification than binoculars and may generally be thought of as small, high-powered telescopes having the optics necessary to provide an erect image (i.e., the image will be displayed as it is naturally viewed rather than upside down, as is the case in many telescopes). Often, spotting scopes will have magnification rates between 20× and 60×. Conventional spotting scopes are typically either configured as "straight" scopes, wherein the optical path is generally along a single axis through the objective lens(es) through the eyepiece, or as "angled" scopes, wherein the eyepiece is set at an angle (conventionally at 45 degrees) relative to the optical axis extending through the objective lens(es). Each of these configurations may provide certain advantages, with a primary distinction between the two being the ergonomics of use.

Because of their relatively high power of magnification, spotting scopes are conventional mounted on a tripod or other support structure to provide some stabilization and to reduce image shake when a user is looking through the eyepiece at a magnified image.

A riflescope includes optics that magnify the view of the target and also help to aim the rifle for purposes of accuracy and precision. For example, a riflescope may include a reticle or other aiming point positioned in the field of view that is provided by the optics of the riflescope, the aiming point being aligned with a target by a user prior to firing the rifle. The aiming point may be adjustable so that a shooter may position the aiming point relative to the rifle in order to compensate for one or more factors that affect the travel of a bullet during its flight toward the target.

It is a continual desire within the industry to provide enhanced optics that provide a user with an improved viewing experience, including the viewing of information that may be provided by an associated electronic system in conjunction with the view of a live scene through the optics, as well the user operation of and interaction with the optical device.

BRIEF SUMMARY OF THE INVENTION

Embodiments of the present disclosure provide optical devices, such as a spotting scope, with integrated range finding features. In accordance with one embodiment, an optical instrument is provided which comprises an objective system, an eyepiece including an ocular system, a first mirror, a laser transmitter, and a receiver positioned behind the first mirror, wherein the first mirror is configured to redirect visible light received from the objective system but permits light at a selected wavelength other than visible light to pass therethrough.

In one embodiment, the optical instrument further includes a receiver configured to receive light passing through the first mirror. In one embodiment, the receiver comprises an avalanche photodiode.

In one embodiment, the first mirror includes a dichroic coating.

In one embodiment, the selected wavelength is approximately 905 nanometers.

In one embodiment, the optical instrument further includes a second mirror, wherein the second mirror redirects visible light from the second mirror from the first mirror to the ocular system.

In one embodiment, the optical instrument further includes a reticle aligned with a transmission of a laser beam from the laser transmitter.

In one embodiment, the optical instrument further includes a display viewable through the eyepiece and indicating a distance between the optical instrument and an identified object aligned with the reticle.

In one embodiment, the reticle is illuminated upon actuation of the laser transmitter.

In one embodiment, the optical instrument further includes a magnification ring associated with the eyepiece configured to alter an amount of magnification of a scene viewed through the eyepiece.

In one embodiment, the optical instrument further includes a housing, wherein the objective system, the ocular system, the first mirror, the laser transmitter and the receiver are located within the housing, wherein the housing is mounted to a tripod.

In accordance with another embodiment of the disclosure, another optical instrument is provided. The optical instrument comprises an objective system, an eyepiece including an ocular system, a transmitter configured to transmit a first signal, a sensor configured to receive a response signal based on the transmitted first signal, and a processor configured to receive the response signal and alter an operational parameter of the optical instrument responsive to receiving the response signal.

In one embodiment, the response signal includes at least one of a hand gesture and an eye gesture.

In one embodiment, the optical instrument further includes a laser range finder. In one embodiment the operational parameter includes actuation of a laser range finder.

In one embodiment, the operational parameter includes navigation of a user interface.

In one embodiment, the operational parameter includes altering the brightness of a display.

In one embodiment, the optical instrument further includes a housing, wherein the objective system, the ocular system, the first mirror, the laser transmitter and the receiver are located within the housing, wherein the housing is mounted to a tripod.

In accordance with another embodiment of the present disclosure, a method is provided for operating an optical instrument having at least one of a display, a range finder and a user interface. The method includes effecting a touchless gesture adjacent a portion of the optical instrument, sensing the touchless gesture, and changing an operational parameter of the optical instrument responsive to the sensed touchless gesture.

In one embodiment, the touchless gesture includes a hand movement, an eye movement or an eyelid movement.

In one embodiment, changing an operational parameter includes at least one of the group consisting of: actuating a range finder, operating the user interface, and altering the brightness of a display.

Features, components, steps or aspects of one embodiment described herein may be combined with features, components, steps or aspects of other embodiments without limitation.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Embodiments of an optical device, such as a spotting scope, along with related components and methods are provided herein. According to various embodiments, a spotting scope may have an optics train employing a folded optical path using multiple mirrors. Additionally, according to certain embodiments, a laser range finder is integrated into the spotting scope. Such a rangefinder may be used to determine the distance between the spotting scope and an object being viewed by the user through the spotting scope.

Figure 1:
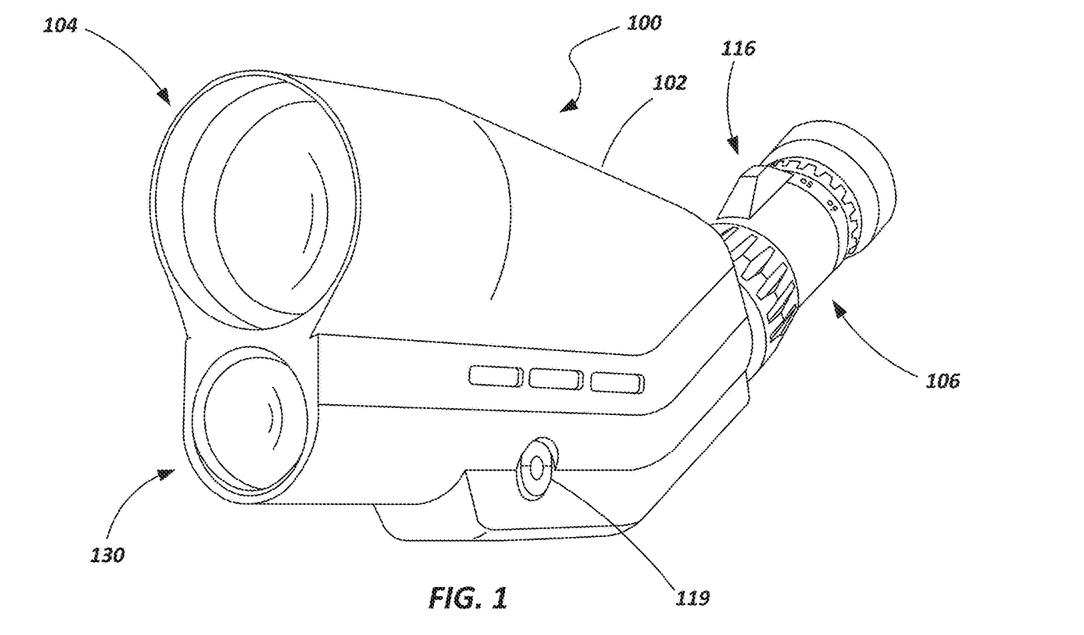
FIGS. 1 and 2 show perspective views of a spotting scope according to an embodiment of the disclosure.
Figure 2:
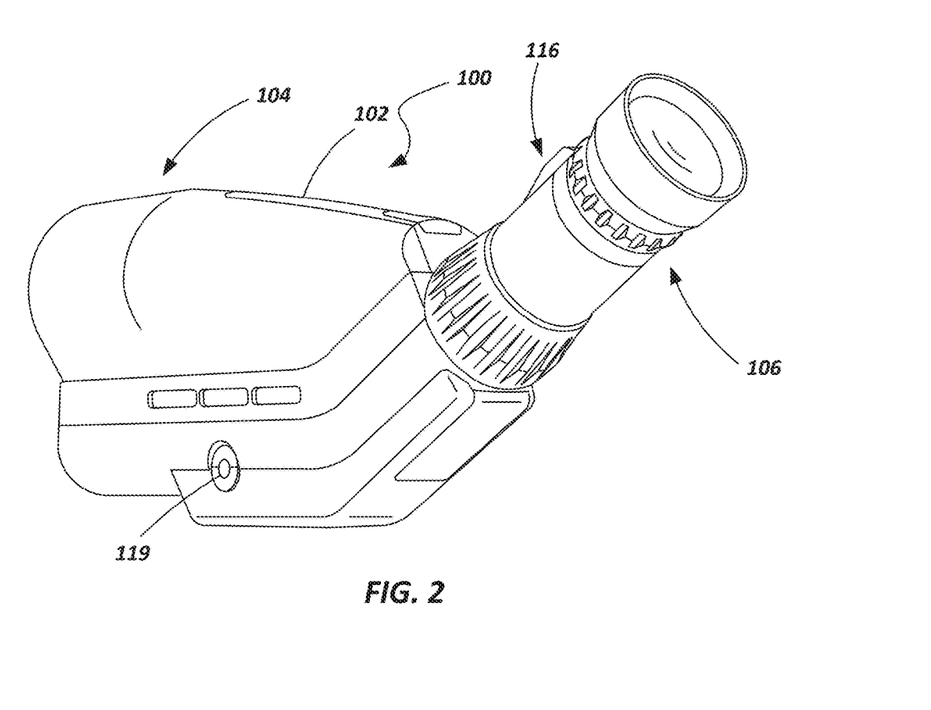
Figure 3:
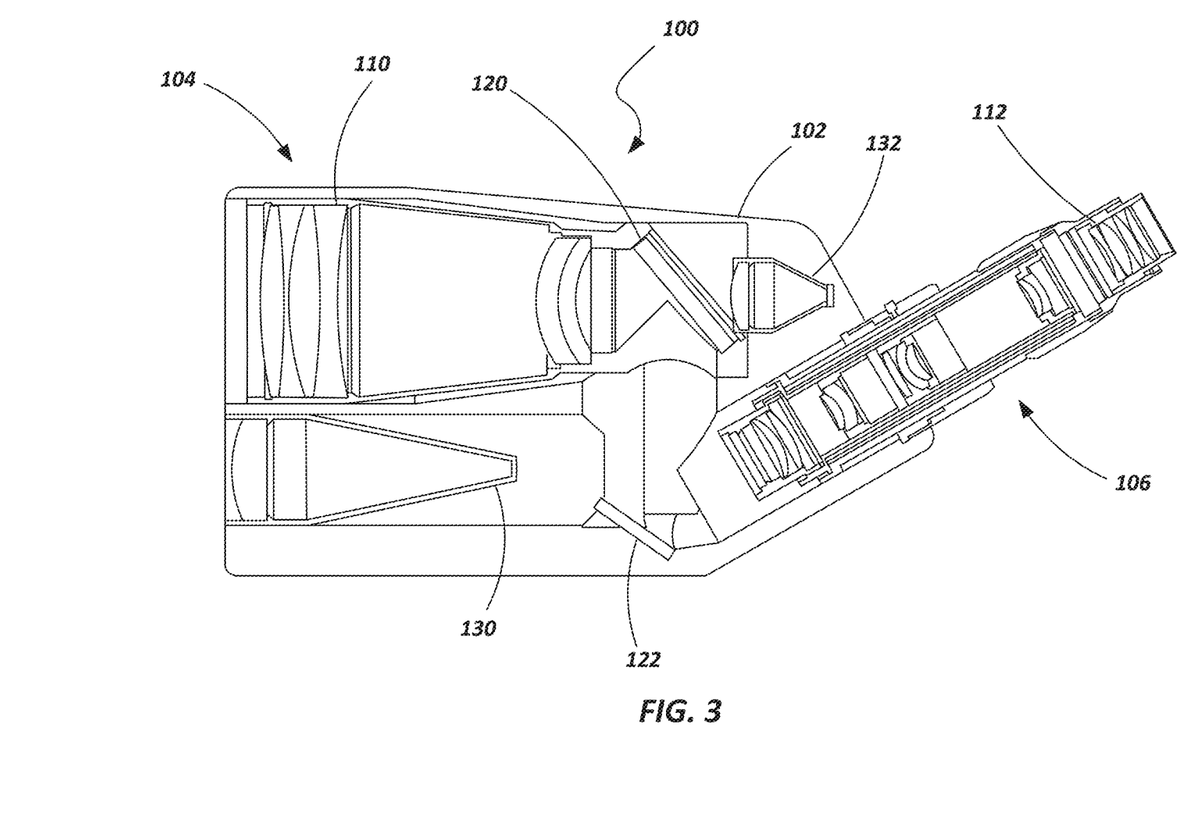
FIG. 3 is cross-sectional view of the spotting scope shown in FIGS. 1 and 2.

Referring to FIGS. 1-3, a spotting scope 100 is shown in accordance with an embodiment of the present disclosure. The spotting scope 100 includes a body 102 that houses an objective system 104 and an eyepiece 106 which includes an ocular system. The objective system 104 includes one or more lenses 110 and is positioned at the distal end of the spotting scope 100 (i.e., the farthest away from a user's eye during use). The eye piece 106 also includes one or more lenses 112 and is located at a proximal end of the spotting scope 100. A plurality of optical elements may also be disposed along the optical path including, for example, an erector system to invert the image so that a user sees the image in a "right side up" orientation when looking through the spotting scope 100 and a focusing system that enables a user to focus the image presented to the user through the eyepiece 106. A magnification ring 116 (also referred to as a power ring) may be used to vary the magnification of the image being viewed though riflescope by adjusting the relative position of various lenses disposed within the spotting scope 100.

For example, in one embodiment, the magnification ring 116 may be rotated about an axis by a user to vary the distance of the lens(es) in the ocular system relative to other lenses (e.g., those associated with an erector system) to alter the magnification or "power" of the optics, thereby enabling a user to alter their view of a target by either "zooming in" (increasing the magnification of the target) or "zooming out" (reducing the magnification of the target). Non-limiting examples of magnification ranges include 15×-45× (meaning that the view is being magnified so that it is between 15 times larger and 45 times larger than actual size), 20×-60× and 10×-60×. Of course, other ranges and powers of magnification are contemplated and the magnification ring of the present disclosure is not limited by the above examples.

The body may include multiple connectors 119 for coupling of the spotting scope 100 with various rail mount systems or direct coupling with a variety of accessories. For example, Picatinny rails, MLock rails or KeyMod rails may be mounted to the body 102 of the spotting scope. Additionally, a connector positioned on the bottom of the spotting scope 100 may be used for coupling with a tripod or other supporting apparatus.

Figure 4A:
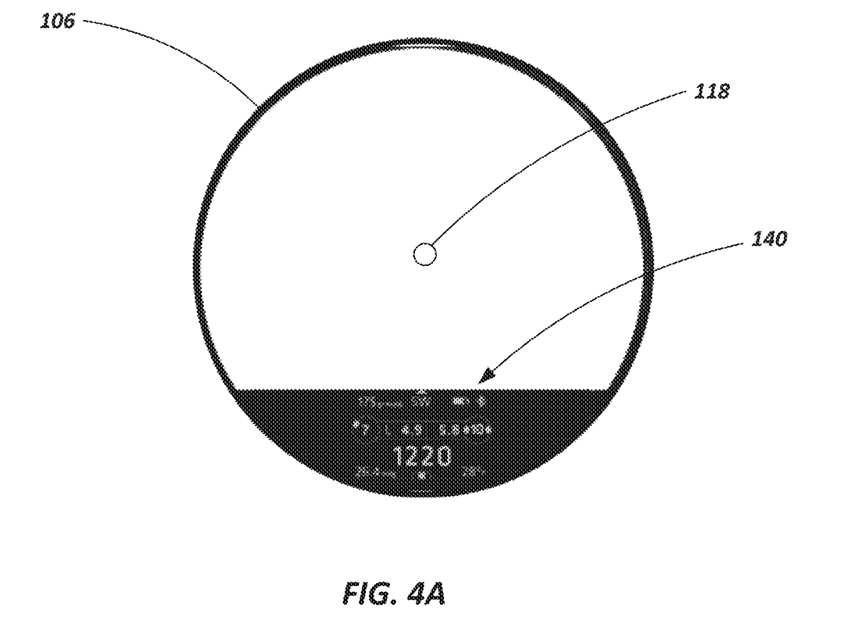
FIGS. 4A and 4B show a display view seen through an eyepiece of a spotting scope in accordance with an embodiment of the present disclosure.
Figure 4B:
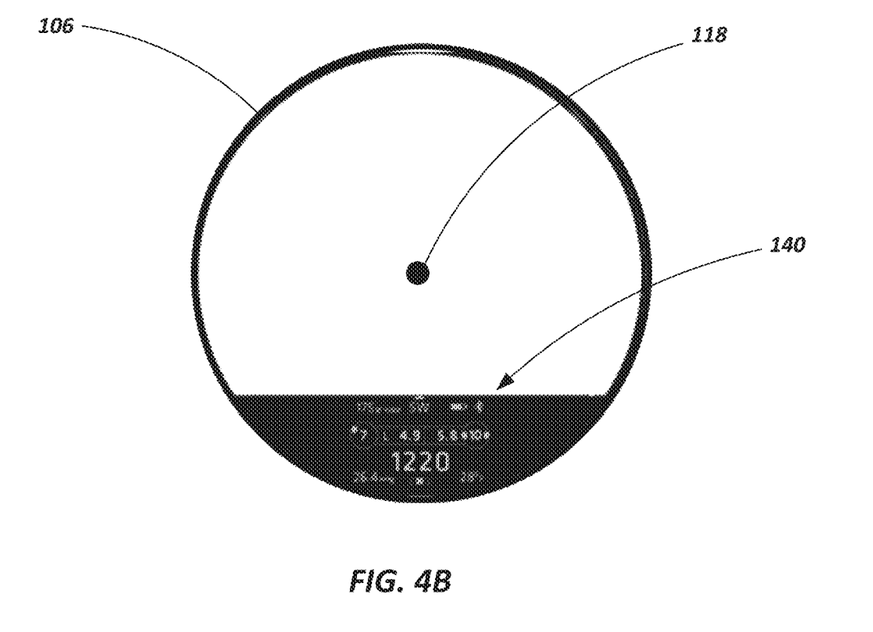

In some embodiments, the view seen through the spotting scope 100 by a user may be overlaid with an image of a reticle 118 or other aiming point (e.g., a shape or pattern providing an aiming point within the user's view) such as illustrated in FIGS. 4A and 4B which illustrate a view that a user may see as they look through the eyepiece 106. In one embodiment, the reticle 118 may be placed within the first focal plane of the spotting scope 100. In some embodiments, the reticle 118 or aiming point may be positioned at an axial center of the view provided through the spotting scope 100. In other embodiments, the reticle 118 or aiming point may be positioned off-center or off-axis.

The reticle 118 may be constructed from optical material, such as optical glass or plastic or similar transparent material, and/or may take the form of a disc or wafer with substantially parallel sides. The reticle 118 may, for example, be constructed from wire, nano-wires, an etching, or may be analog or digitally printed, or may be projected (for example, on a surface) by, for example, a mirror, video, holographic projection, or other suitable means on one or more wafers of material. In some embodiments, the reticle 118 may include an illuminated reticle. An illuminated reticle may be etched into an optical surface, the etching being backfilled in with a reflective material such as, for example, titanium oxide, that illuminates when a light or diode powered by, for example, a battery, chemical, photovoltaic or other power source, is rheostatically switched on.

In addition to the various lenses in the optical train of the spotting scope 100, a first mirror 120 is positioned aft the objective system 104 and a second mirror 122 is positioned aft (in the optical path) the first mirror 120, but prior to various lens elements associated with the ocular system in the eyepiece 106. Thus, as will be discussed in further detail below, visible light from a view being observed by a user enters into objective system 104, is reflected off of the first mirror 120, then reflected off of the second mirror 122, and passes through various optical elements associated with the eyepiece 106 to the eye of a user.

The spotting scope 100 may further include a laser transmitter 130 configured to emit a laser beam at a specified wavelength. Thus, for example, when a user presses a button on the spotting scope, or otherwise actuates the laser (as is discussed below), a laser beam is transmitted from the spotting scope 100 to an identified object aligned with the reticle or aiming point as seen by a user through the eyepiece 106. In one embodiment, the reticle 118 may be configured such that it illuminates or is otherwise altered to indicate to the viewer that the transmitter 130 is emitting a laser beam to the identified object in view. Thus, for example, as seen in FIGS. 4A and 4B, when the transmitter 130 is not activated, the reticle 118 may be semi-opaque or indicated by a shaded portion such as indicated in FIG. 4A. However, when the transmitter 130 is activated, the reticle 118 may illuminate (e.g., in red or some other color) or otherwise be altered to indicate the actuation of the transmitter 130.

The spotting scope 100 further includes a receiver 132 positioned behind the first mirror 120 and out of the main (or visible) optical path. The receiver 132 may include, for example, an avalanche photodiode (APD) configured to detect laser light from the transmitter 130 that has been reflected off of an identified object aligned with the reticle or aiming point. Electronics associated with the transmitter 130 and receiver 132 (e.g., a processor) may be configured to measure the time that it takes for the laser beam to travel from the transmitter 130 of the spotting scope 100, reflect off of the identified object of interest, and return to the receiver 132. A processor or other computing system may then use the measured time to calculate the distance between the spotting scope 100 (and, thus, the user) and the object viewed through the spotting scope 100 and identified by placement of the reticle 118.

Figure 5:
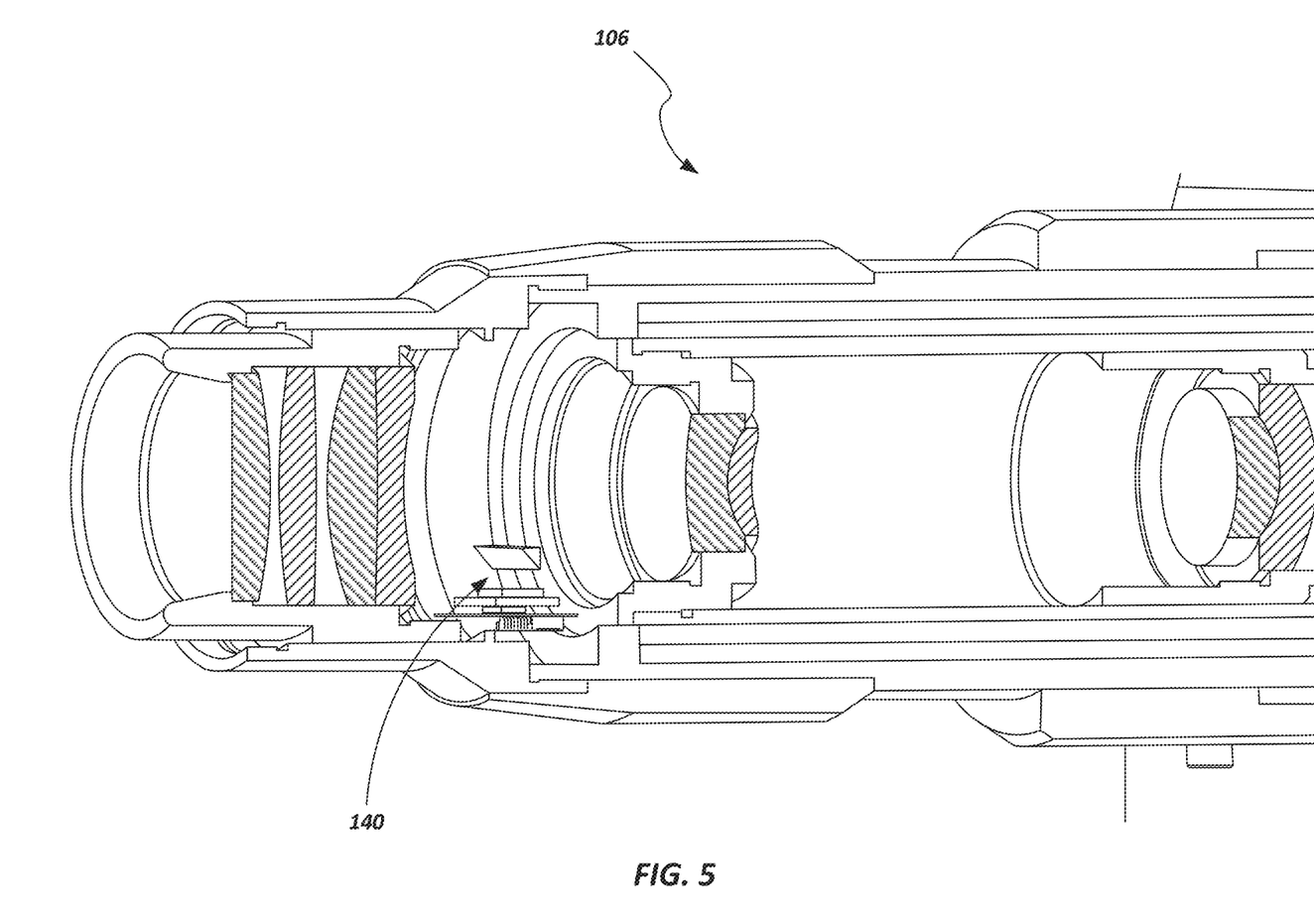
FIG. 5 is an enlarged view of a portion of the cross-sectional view show in FIG. 3.

Once the distance between the spotting scope 100 and the object of interest is calculated, the calculated distance may be provided to a display 140 for a user to view. As seen in FIGS. 4A, 4B and 5, a display 140 may be arranged within the eyepiece 106 so that a user looking through the eyepiece 106 may review data (such as the calculated distance) without having to remove their eye from the view provided by the spotting scope 100. In certain embodiments, the display 140 may be physically located in the eyepiece 106 at any of a variety of locations. For example, in one embodiment, the display 140 may be positioned at a focal plane (e.g., a second focal plane along the optical path) within the eyepiece. In other embodiments, the display may be positioned behind a given focal plane (e.g., behind the second focal plane). In some embodiments, the display 140 may be arranged to be at an "effective focal distance" that is equal to the distance between a focal plane and a defined ocular lens within the eyepiece. Examples of such a configuration may be found, for example, in U.S. patent application Ser. No. 15/581,244, entitled RIFLESCOPE WITH FEEDBACK DISPLAY AND RELATED METHODS, filed on Apr. 28, 2017, the disclosure of which is incorporated by reference herein in its entirety. In some embodiments, the display may include, for example, an AMOLED (active matrix organic light-emitting diode) display associated with an angled mirror to provide information to the user through the eyepiece 106.

It is also noted that the spotting scopes of the embodiments described herein (or various features of such scopes) may be used in conjunction with, for example, a riflescope. For example, in a basic sense, the rangefinding data obtained from the spotting scope may be entered into a system associated with a riflescope, such as the example described in previously incorporated U.S. patent application Ser. No. 15/581,244. In some embodiments, the spotting scope may be programmed with ballistics information associated with a given rifle configuration in order to perform calculations and/or provide information regarding the adjustment of a riflescope. In some embodiments, the spotting scope and a riflescope may be paired, or placed in communication with one another, either wirelessly (e.g., Bluetooth®, WiFi or nearfield communications (NFC)) or by way of wired or tethered communications. Of course, the spotting scope may be likewise paired with a variety of other devices including, for example, smartphones, tablets, portable computing devices, wind meters.

In some embodiments, the spotting scope 100 may include various sensors for determining various environmental and operating conditions. For example, in some embodiments, sensors may be used to detect or determine ambient temperature and ambient pressure may be incorporated into the spotting scope. In some embodiments, sensors may be used to determine the incline and/or the azimuth of the spotting scope. In some embodiments, the spotting scope 100 may include a GPS radio to provide location services in association with operation of the spotting scope of other related devices.

Figure 6:
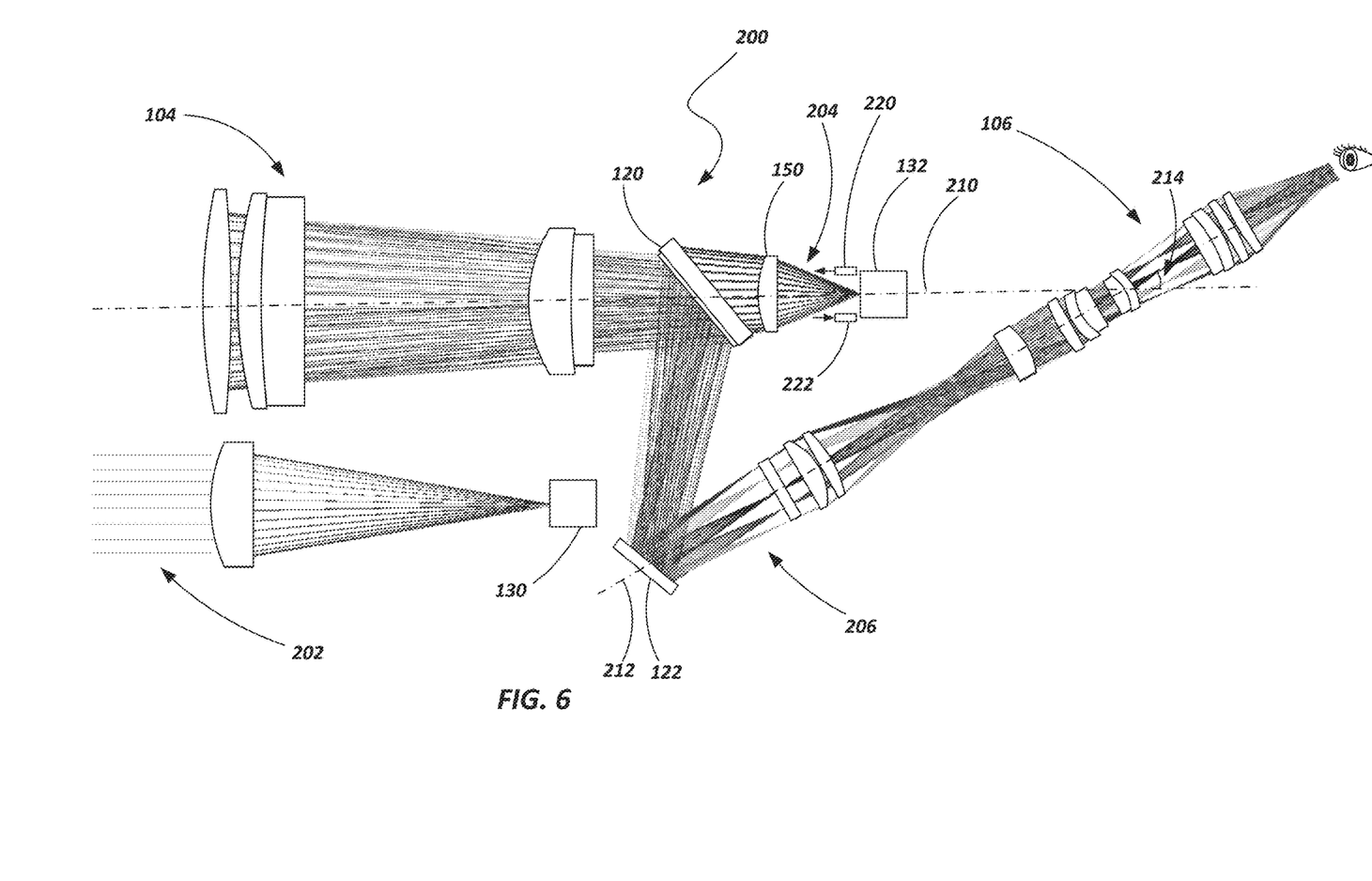
FIG. 6 is a schematic view of the optics train of a spotting scope according to an embodiment of the present invention.

Referring now to FIG. 6, an optical path 200 of a spotting scope (e.g., the spotting scope 100 described above) is illustrated. The optical path 200 may include emitted light 202 from the transmitter 130. Light reflected off of an object identified through the spotting scope (e.g., by alignment with the reticle 118) returns to the objective system 104 of the spotting scope along with visible light from the scene view at which the spotting scope 100 is aimed. All of this light (both visible and laser) passes through the objective system 104 in the direction of a first axis 210 until it reaches the first mirror 120. The first mirror 120 is configured to reflect visible light, but permit light at a specific wavelength to pass through the mirror without reflection. Thus, for example, the first mirror 120 may include a dichroic coating enabling it to reflect visible light, but permit passage of the reflected laser light that was originally emitted from the transmitter 130. In one embodiment, the laser light from the transmitter may exhibit a wavelength of approximately 905 nanometers (nm). This laser light passes from the first mirror 120, and may pass through a converging lens 150 or other optical element, and to the receiver 132 as indicated generally by reference numeral 204. Visible light reflects off of the first mirror 120 to the second mirror 122, and then passes through the various optical elements associated with the eyepiece 106 in a direction that is along a second axis 212, as indicated generally by reference numeral 206. In one embodiment, the second axis 212 is set and an acute angle 214 relative to the first axis 210. For example, the second axis 212 (which corresponds with the eyepiece 106) may be at an angle of approximately 15 degrees to approximately 45 degrees relative to the first axis 210. In other embodiments, the angle between the two axes 210 and 212 may be approximately 20 degrees to approximately 30 degrees.

The use of a light separating element such as a dichroic mirror to separate the reflected laser light from the visible light provides various advantages including the ability to integrate a laser range finder into of the spotting scope without unduly increasing the size of the spotting scope and while providing enhanced performance of a spotting scope without unduly increasing the cost or complexity of its manufacture.

In one example embodiment, a spotting scope such as described herein may be manufactured as a 10-60×75 mm (millimeter) spotting scope using extra low dispersion (ED) glass providing a true 6:1 magnification ratio with a 35 mm transmitter aperture and a dichroic mirror configured to reflect light in the range of approximately 450-750 nm, while permitting passage of light at approximately 905 nm to pass through. Such a spotting scope may include an ocular system having optical elements exhibiting a 37 mm diameter. Such a spotting scope may be approximately 15 inches (385 mm) in length and approximately 6 inches (155 mm) in height and have eye relief of approximately 25 mm to approximately 31 mm. Such a spotting scope may have a field of view of approximately 3.8° to 0.63° (or approximately 330 feet—198 feet at a thousand yards) with an entrance pupil of approximately 40 mm when at 10× and approximately 75 mm when at 60×0 and an exit pupil of approximately 4 mm when at 10× and approximately 1.25 mm when at 60×. The transmitter may be positioned below the objective system with a 35 mm aperture and be configured to emit a laser to a distance of approximately 3,500 meters (m) at an energy level of approximately 500 nano-Joules/pulse (nJ/pulse) and with a beam divergence of approximately 1.9×0.5 milliradians (mrad). The spotting scope may be configured to focus at a range of approximately 25 yards to infinity and include a diopter for eyesight correction or adjustment of +/−4 stops of correction. The body may be formed of a material comprising magnesium and may include rubber coating or other protective panels. The spotting scope may be powered by one or more batteries such as CR123 type, or any other suitable battery. The display may include an AMOLED display having a resolution of 304×256.

In some embodiments, the spotting scope may be configured to be operated using any of a variety of gesture controls. For example, in one embodiment, an infrared diode 220 and an associated sensor 222 may be positioned behind the dichroic mirror 120 at a location before or after the associated lens 150 such as shown in FIG. 5. In some embodiments, the light source and/or sensor may be combined with or otherwise associated with the receiver 132. The light source 220 and sensor 222 may be configured with an associated processor to operate various functions of the spotting scope 100 upon sensing certain actions by the user.

Figure 7:
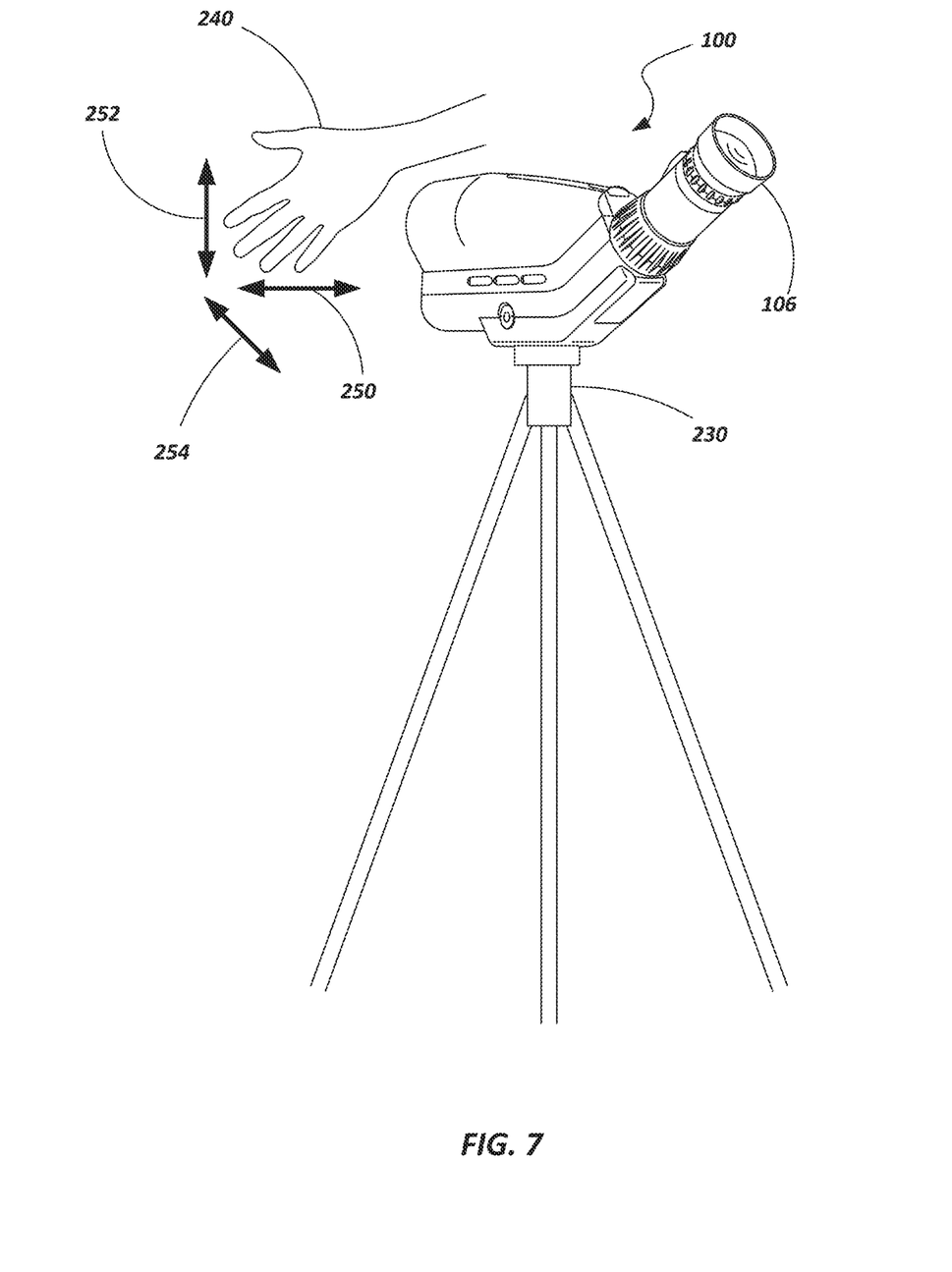
FIG. 7 is a perspective view of a spotting scope in accordance with an embodiment of the disclosure.

For example, with reference to FIG. 7 (and with continued reference to FIGS. 1-6), a spotting scope 100 is shown in a supporting device, such as a tripod 230, for purposes of providing a stabilized image with looking through the eyepiece 106 of the spotting scope. Because pushing physical buttons on the spotting scope 100 may be undesirable in certain situations (e.g., such an action would introduce image shake or inadvertently change the positioning of the spotting scope), a user may perform any number of gestures to control one or more aspects of the spotting scope 100. In one embodiment, a user may wave their hand 240 in a specific manner or pattern. The waving of the user's hand interacts with the light source (e.g., the infrared diode 220) and the change in the light is detected by the sensor 222 to determine what operation is desired by the user.

When utilizing hand gestures to operate certain functions of the spotting scope 100, various schemes may be utilized (which schemes may be preprogrammed into the spotting scope, or user defined). In one example, a user may move their hand in front of the spotting scope in one of a variety of defined patterns such as horizontally, as indicated by directional arrow 250, vertically, as indicated by directional arrow 252, or towards and a away from the spotting scope 100, as indicated by directional arrow 254. Each of these different gestures may result in a different operational control of the spotting scope. For example, moving the user's hand quickly towards or away from the spotting scope 100 may be used to actuate the laser range finder and place it in a "one time" ranging mode, meaning that it will take a single distance reading for an object at which the reticle is aimed.

In another example, if the user moves their hand towards or away from the spotting scope 100, but keeps their hand in a "hovering" position in front of the spotting scope for a set amount of time (e.g., one second, two seconds, three seconds, etc.), the range finder may be actuated to function in a continuous setting, wherein the display is continually updated with information about the distance to the object at which the reticle is aimed.

Other examples include moving the user's hand side to side (i.e., directional arrow 250) may be used to move from one page of a menu (e.g., as viewed on the display 140) to another while up and down motions of the user's hand in front of the spotting scope 100 may be used to change the brightness or intensity of the display 140. Of course, a variety of other control configurations may be implemented and may even be user defined so that operation of the spotting scope may be customized by the user to their specific preferences. Such customization may be programmed, for example, through a menu system, using the display 140 and associated input buttons, or using a separate computing device that is placed in communication with the spotting scope 100, either wirelessly or by tethered connections.

In another embodiment, gesture control may be implemented by tracking motion of a user's eye, eyelid or both. For example, a light source (e.g., infrared diode) and sensor may be positioned in the eyepiece 106 to track movements of a user's eye and or eyelid. In some embodiments, such a light source and sensor may be associated with the display 140 (e.g., reflecting off of the same mirror). In such an embodiment, the sensor may detect blinking actions by a user and control the spotting scope based on the number of blinks, the rapidity of the blinks, or a combination of both. Additionally, or alternatively, the sensor may detect rapid movement of the user's eye in a certain direction, similar to detection of a user's hand as discussed above. In some embodiments, both hand gesture and eye gesture control may be implemented to provide increased control of the spotting scope without having to physically manipulate a switch, button or other input device on the spotting scope, or without having to physically touch the spotting scope at all.

In addition to the use of gesture control, or in the alternative, the spotting scope 100 may be controlled wirelessly through another device such as a smart phone, a tablet, some other computing device, or a dedicated remote control that communicates with the spotting scope 100.

Figure 8:
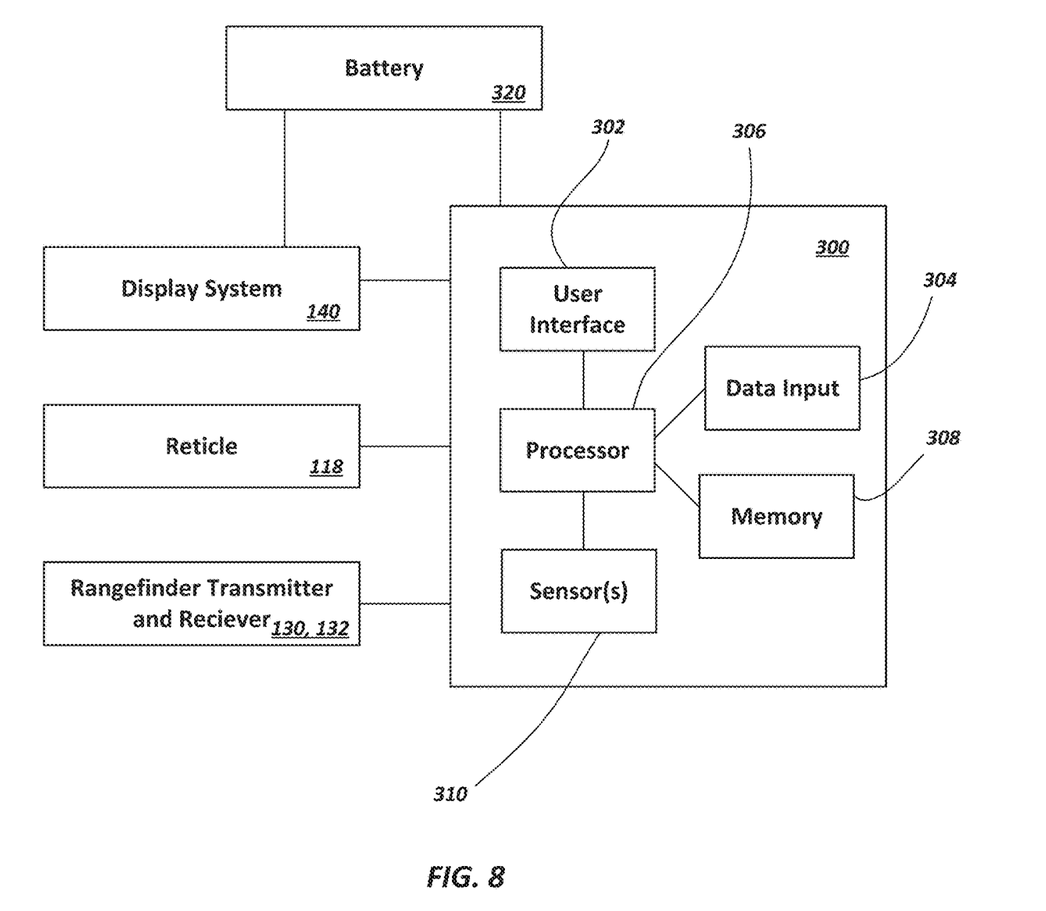
FIG. 8 is a block diagram of a system associated with a spotting scope according to an embodiment of the present disclosure.

Referring now to FIG. 8, a block diagram is shown depicting various electronic components utilized in a spotting scope according to an embodiment of the present disclosure. The control module 300 may include, without limitation, a user interface 302, data input device 304, a processor 306, memory 308, and one or more sensors 310.

The user interface 302 may include a plurality of input and/or output devices such as buttons, keys, knobs, touch-screens, displays, speakers, microphones, etc. Some components of the user interface 302 such as, for example, buttons, may be used to manually enter data such as, for example, wind data, display intensity data, reticle intensity data, ballistic profile data, static conditions of the spotting scope system, GPS coordinate data, compass coordinate data, etc. This data may be received by the processor 306 and saved into the memory 308. The data may also be used by the processor 306 in an algorithm or to execute an algorithm for control of the spotting scope, for providing data for control of an associated riflescope, or for other reasons.

The data input device 304 may include wired or wireless communications devices and/or may include any type of data transfer technology such as, for example, a USB port, a mini USB port, a memory card slot (e.g., a microSD slot), NFC transceiver, Bluetooth® transceiver, Firewire, a Zig-Bee® transceiver, a Wi-Fi transceiver, an 802.6 device, cellular communication devices, and the like. It is noted that, while termed a data input device, such may be used in two way communications, providing data output as well.

The processor 306 may be any type of processor known in the art that may receive inputs, execute algorithms and/or processes, and may include, without limitation, one or more general-purpose processors and/or one or more special-purpose processors (such as digital signal processing chips, graphics acceleration chips, and/or the like). The processor 306 may be used to control various processes, algorithms, and/or methods in the operation of the riflescope. The processor 306 may control operation of a display system 140 and/or a reticle 118. The processor 308 may also receive inputs from the user interface 302, the data input 304, the memory 308, the sensor(s) 310, a transmitter 130 and receiver 132 and/or from other sources. It is noted that the gesture control discussed above may be implemented through various components depicted in FIG. 8 including, for example, the user interface 302 (which might include a light source such as an infrared diode or other transmitting device), the data input 304 and the sensors 310 (which might include a dedicated sensor associated with the light source or other transmitting device).

The memory 308 may include any type of digital data storage such as such as random access memory ("RAM") and/or read-only memory ("ROM"), which can be programmable, flash-updateable, and/or the like. In other embodiments, the memory may include memory from an externally connected device including, for example, a disk drive, a drive array, an optical storage device, or a solid-state storage device. In some embodiments, the memory 308 may be configured to store ballistic information, GPS data and other operational data.

Data may be entered from another device (e.g., the processor 306 may receive data via the data input device 304 which may be entered from another device such as computer, laptop, GPS device, a rangefinder, tablet, or smartphone, etc.) and stored into the memory 308. Such data may include, for example, calibration data, a ballistic profile lookup table that cross-references rotational data and/or linear data with shoot-to-range values, rifle data, projectile data, user data, environmental conditions, GPS data, etc.

The sensor(s) 310 may be used to sense any of a variety of environmental conditions or characteristics associated with the use of the spotting scope. For example, the sensor(s) 310 may sense atmospheric conditions (such as humidity, temperature, pressure, etc.), inclination, and/or the sight direction of the spotting scope (compass direction). While a single sensor is shown, any number of sensors may be included. Sensor data may be recorded by the processor 306 and saved into the memory 304 and/or used in the processing of instructions for operation of the spotting scope 100 or for use by another device. Additionally, as noted above, the sensors 310 may include sensors associated with gesture control, including without limitation, hand gestures and eye gestures.

A battery 320 may be connected to the control module 300 and/or the internal display system 140. In some embodiments, the battery 320 may be directly coupled with the reticle 170 and/or the transmitter 130 and receiver 132. In some embodiments, the battery 320 may also be directly coupled with processor, 306, the sensor(s) 310, the memory 308, and/or other components of the spotting scope 100. The battery 320 may include any type of battery power source without limitation.

The control module 300 may also include software elements, which may be located within working memory 308. The software elements may include an operating system and/or other code, such as one or more application programs.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. An optical instrument comprising:
   an objective system;
   an eyepiece including an ocular system, the objective system and the eyepiece defining a first optical path wherein visible light from a scene view is passed through the objective system and through the eyepiece;
   a first mirror;
   a laser transmitter spaced from the first optical path and configured to transmit a laser beam toward an object in the scene view;
   a receiver positioned behind the first mirror, wherein the first mirror is configured to redirect the visible light received from scene view passing through the objective system but permit passage of laser light reflected from the object to the receiver.

2. The optical instrument of claim 1, wherein an optical axis of the ocular system is arranged at acute angle relative to an optical axis of the objective system.

3. The optical instrument of claim 1, wherein the receiver comprises an avalanche photodiode.

4. The optical instrument of claim 1, wherein the first mirror includes a dichroic coating.

5. The optical instrument of claim 4, wherein the laser exhibits a wavelength of approximately 905 nanometers.

6. The optical instrument of claim 1, further comprising a second mirror, wherein the second mirror redirects visible light from the first mirror to the ocular system.

7. The optical instrument of claim 6, further comprising a reticle aligned with a transmission of the laser beam from the laser transmitter.

8. The optical instrument of claim 7, further comprising a display viewable through the eyepiece and indicating a distance between the optical instrument and the object in the scene view when the object is aligned with the reticle.

9. The optical instrument of claim 7, wherein the reticle is illuminated upon actuation of the laser transmitter.

10. The optical instrument of claim 1, further comprising a magnification ring associated with the eyepiece configured to alter an amount of magnification of the scene view.

11. The optical instrument of claim 1, further comprising a housing, wherein the objective system, the ocular system, the first mirror, the laser transmitter and the receiver are located within the housing, wherein the housing is mounted to a tripod.

12. An optical instrument comprising:
   an objective system;
   an eyepiece including an ocular system, the objective system and the ocular system defining a first optical path wherein visible light from a scene view is passed through the objective system and through the eyepiece;

a transmitter configured to transmit a signal through at least one of the objective system and the eyepiece;

a sensor configured to receive a first response signal through at least one of the objective system and the eyepiece, the first response signal being based on a first gesture of the user interacting with the transmitted signal;

a processor configured to activate or deactivate a laser beam of a rangefinder responsive to the sensor receiving the first response signal.

13. The optical instrument of claim 12, wherein the response signal is based on an eye gesture.

14. The optical instrument of claim 12, wherein the response signal is based on a hand gesture.

15. The optical instrument of claim 12, wherein the sensor is configured to receive a second response signal through at least one of the objective system and the eyepiece, the second response signal being based on a second gesture of the user interacting with the transmitted signal; and wherein the processor is configured to alter an operational parameter of the optical instrument.

16. The optical instrument of claim 15, wherein the operational parameter includes navigation of a user interface.

17. The optical instrument of claim 15, wherein the operational parameter includes altering the brightness of a display.

18. The optical instrument of claim 12, further comprising a housing, wherein the objective system, the ocular system, the first mirror, the laser transmitter and the receiver are located within the housing, wherein the housing is mounted to a tripod.

19. A method of operating an optical instrument having a range finder, the method comprising:

effecting a touchless gesture adjacent a portion of the optical instrument;

sensing the touchless gesture;

activating or deactivating a laser beam of the range finder responsive to the sensed touchless gesture.

20. The method according to claim 19, wherein the touchless gesture includes a hand movement, an eye movement or an eyelid movement.

21. The method according to claim 19, further comprising:

effecting a second touchless gesture adjacent a portion of the optical instrument;

sensing the second touchless gesture; and responsive to the sensed second touchless gesture, changing an operational parameter of the optical instrument including at least one of the group consisting of: navigating a user interface of the optical instrument and altering a level of brightness of a display.

* * * * *